United States Patent [19]
Devercelli

[11] Patent Number: 5,880,807
[45] Date of Patent: Mar. 9, 1999

[54] SPECTACLE MOUNT

[76] Inventor: Pietro Devercelli, Via Poligonia, 90, 15100 Alessandria, Italy

[21] Appl. No.: 894,565

[22] PCT Filed: Mar. 29, 1996

[86] PCT No.: PCT/IT96/00062

§ 371 Date: Sep. 29, 1997

§ 102(e) Date: Sep. 29, 1997

[87] PCT Pub. No.: WO96/30799

PCT Pub. Date: Oct. 3, 1996

[30] Foreign Application Priority Data

Mar. 31, 1995 [IT] Italy .................................. TO95A0250

[51] Int. Cl.⁶ ...................................................... G02C 1/04
[52] U.S. Cl. ............................ 351/106; 351/110; 351/116
[58] Field of Search ..................................... 351/153, 140, 351/111, 116, 110, 106, 41, 108, 109, 103, 149; 16/228

[56] References Cited

U.S. PATENT DOCUMENTS 5,073,020 12/1991 Lindberg et al. .

FOREIGN PATENT DOCUMENTS

| 94 17 374.5 | 1/1995 | Germany . |
|---|---|---|
| 2 274 728 | 8/1994 | United Kingdom . |
| WO 92/08158 | 5/1992 | WIPO . |
| WO 95/18985 | 7/1995 | WIPO . |
| WO 96/02014 | 1/1996 | WIPO . |

*Primary Examiner*—Hung Xuan Dang
*Attorney, Agent, or Firm*—Shlesinger Arkwright & Garvey LLP

[57] ABSTRACT

A mount made entirely of wire material for spectacles with at least two lenses, wherein each hinge includes a fixed portion presenting an eyelet with a straight end used as a hinge pin about which to rotate the respective lateral arm on the hinge; the eyelet forms a stop for the respective lateral arm, to prevent the lateral arm from rotating beyond a normal work position; a movable portion of the hinge presents a coiled portion on the hinge pin and terminating with a cut-off turn forming a stop for arresting rotation of the lateral arm towards the respective lens; the lenses are connected to each other by a wire bridge; and a chamfer may be formed along the entire edge of each lens to house a rubber ring for protecting the edge or for ornamental purposes.

21 Claims, 2 Drawing Sheets

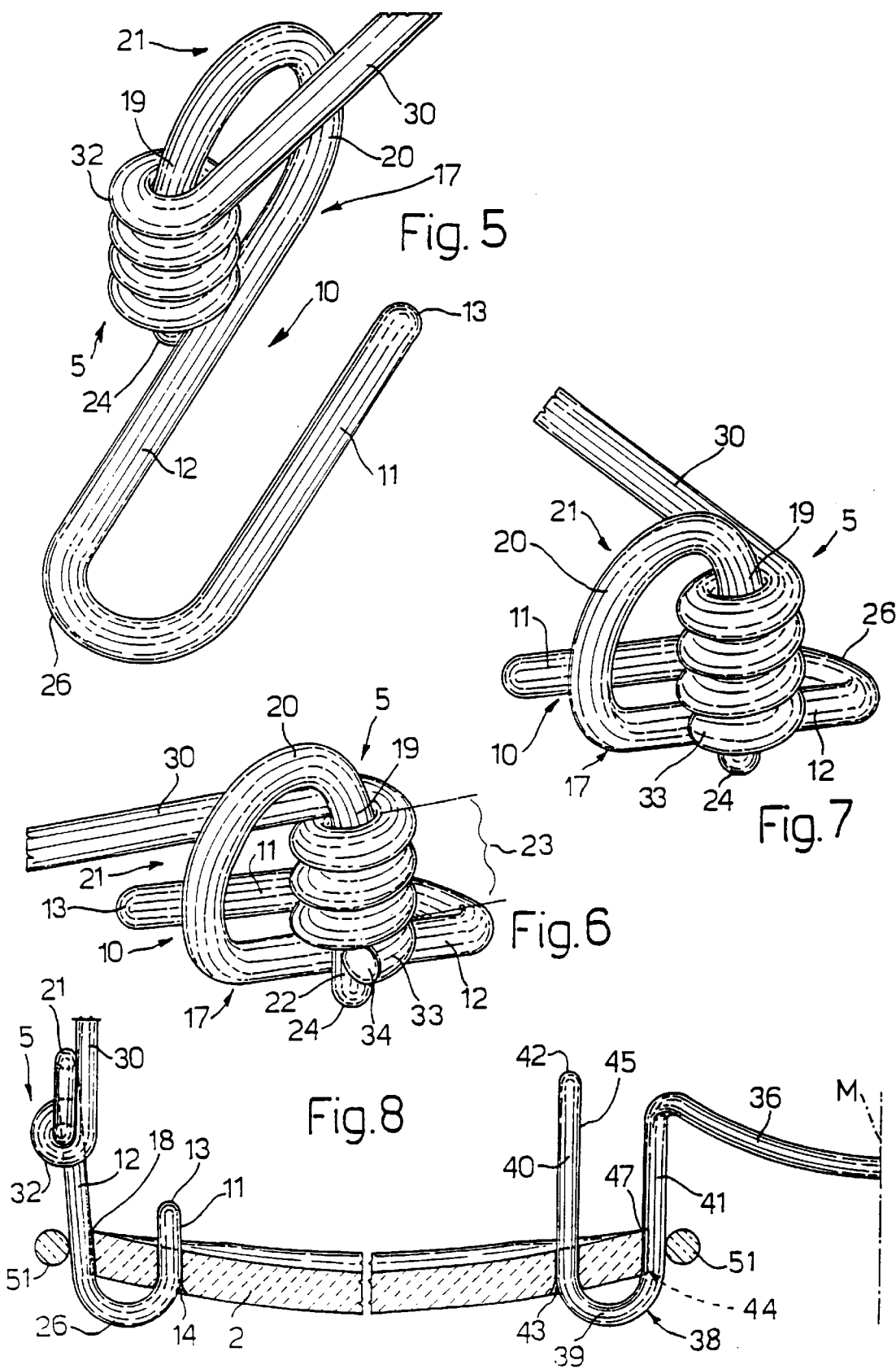

SPECTACLE MOUNT

TECHNICAL FIELD

The present invention relates to a perfected mount for spectacles with two or more lenses, the mount being made of wire material and comprising two lateral arms pivoting on respective hinges, each connected to a respective lens by an appropriately bent portion of wire comprising, on one side, a pin, and, on the other, a bend fitted elastically to the lens; and a bridge for connecting the lenses, and also made of wire material, is fitted elastically to the lenses by means of conveniently shaped bends.

More specifically, the present invention relates to a mount made exclusively of wire material by simply bending and cutting the wire, with absolutely no other form of connection between the wire portions, e.g. welds, screws or rivets.

BACKGROUND ART

Numerous spectacle designs are currently available, many of which feature frames made entirely of plastic material, or made partly of plastic and partly of metal elements, or made entirely of metal elements; and the lenses are normally supported on a portion of the frame fitted tightly about the edge of the entire lens, or a portion of the frame is connected to the lenses by means of nuts and screws engaging holes formed in the lenses.

In such designs, the bridge connecting the lenses presents two plates which rest laterally on either side of the nose to support the spectacles at the front. In some designs, the plates are fixed and formed in one piece with the frame, or are movable and fitted to the bridge by an articulated joint to enable them to adapt and rest comfortably on either side of the nose.

In both cases, besides being unsightly, the plates eventually become a source of discomfort with prolonged use, and, by virtue of their shape, are easily soiled, thus further impairing their overall appearance.

European Patent n. 256.098-B1 relates to a spectacle mount made of metal wire, and wherein the hinges of the lateral arms each comprise a fixed straight portion connected to the lens by a bent wire portion and forming the hinge pin, and a movable portion connected to the lateral arm and comprising a portion of coiled wire rotatable about the fixed pin. The free end of the coiled wire portion acts as a stop for arresting rotation of the coil, and hence of the lateral arm, by contacting the bent wire portion; the bent wire portion joining the straight portion or fixed pin to the lens is bent radially outwards once per end, with the bends lying in planes perpendicular to each other, and continues towards the lens with a U-shaped bend lying in a plane substantially parallel to the normally vertical fixed pin, and which is designed to be inserted elastically into a corresponding opening formed close to the outer edge of the lens.

Similarly, the bridge connecting the two lenses is fitted to each lens by a wire portion bent into a U and inserted elastically into an opening formed close to the inner edge of the lens.

Two movable plates for support on either side of the nose are fitted in freely adjustable manner to respective wire curls integral with the connecting bridge.

The above state-of-the-art mount nevertheless presents several drawbacks. Forming openings large enough to house the two wire portions forming the bend means removing a large amount of material, which, besides the time and cost involved, also weakens the lens. Moreover, since the bend, once inserted inside the opening, works by expanding elastically, the lenses, which are normally made of highly rigid, fragile material with a low safety load, are subjected to dangerous tensile and bending stress. To reduce the risk involved, large openings are therefore formed closer to the center of the lens, which, besides noticeably invading the field of view, creates discomfort to the wearer, especially in the case of thick lenses, by creating highly noticeable opaque or reflecting walls. Also to be taken into account is the accumulation of soil in the gap between the wires and the opening, which impairs the appearance of the spectacles which must therefore be disassembled and cleaned periodically.

DISCLOSURE OF INVENTION

It is a principal object of the present invention to provide a spectacle mount designed to overcome the aforementioned drawbacks.

More specifically, it is an object of the present invention to provide a spectacle mount formed in such a manner as to require a minimum number of bends and as little material as possible, so that it is cheap to produce, lightweight, and easy to use and handle, and more generally, provides for greater overall comfort, straightforward design, and a more pleasing appearance.

According to the present invention, there is provided a perfected spectacle mount comprising two lateral arms pivoting on respective hinges connected to the lenses; an intermediate connecting bridge between the lenses; and stop means for arresting the lateral arms; the hinges being made of wire material, and each comprising a portion connected to the respective lens, and a portion connected to the respective lateral arm; a first of said portions terminating with a straight portion of wire acting as a pin; and a second of said portions comprising a portion of wire coiled about the straight portion;

characterized in that the stop means comprise an eyelet of wire formed in one piece with said first portion and presenting an end terminating with said straight portion, which is forced elastically by the eyelet against a lateral stop of the first portion acting as an axial stop for the coiled wire portion on the opposite side of said eyelet; the eyelet cooperating with the respective lateral arm to prevent rotation of the lateral arm beyond a normal work position.

BRIEF DESCRIPTION OF THE DRAWINGS

A preferred, non-limiting embodiment of the present invention will be described by way of example with reference to the accompanying drawings, in which:

FIG. 5 shows an enlarged detail in perspective of the hinge of the mount according to the present invention;

FIG. 6 shows an enlarged, detailed view in perspective of the FIG. 5 hinge with the lateral arm in the open position;

FIG. 7 shows an enlarged view in perspective of the FIG. 6 hinge with the lateral arm in the closed position;

FIG. 8 shows a partial half section of the spectacles along line VIII—VIII in FIG. 1.

BEST MODE FOR CARRYING OUT THE INVENTION

Figure 1:
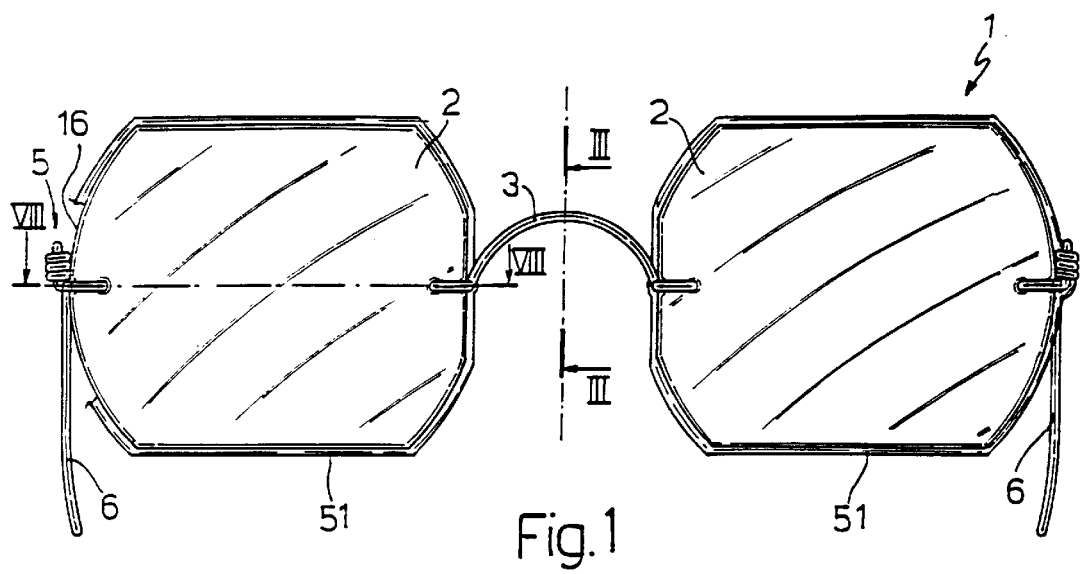
FIG. 1 shows a front view of a pair of spectacles featuring a metal wire mount in accordance with the present invention.
Figure 2:
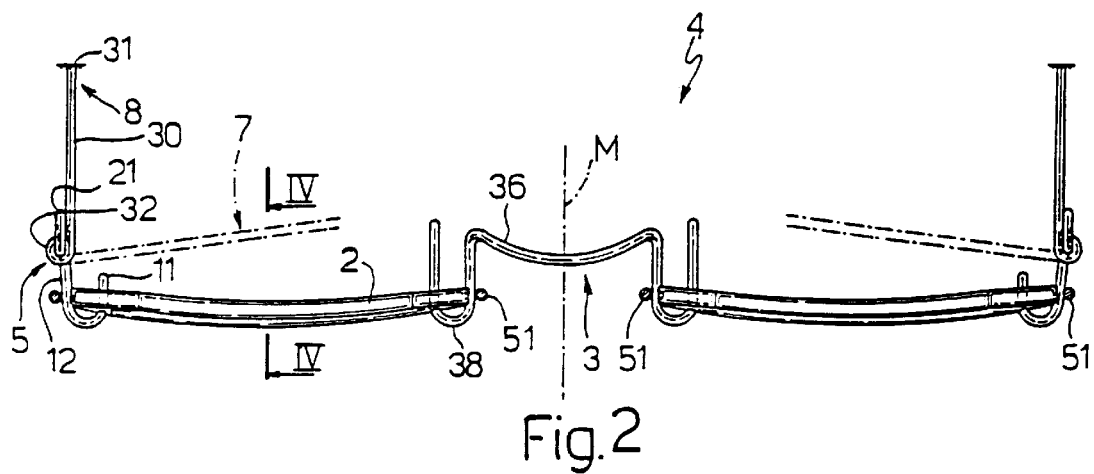
FIG. 2 shows a plan view of the spectacles in FIG. 1.
Figure 4:
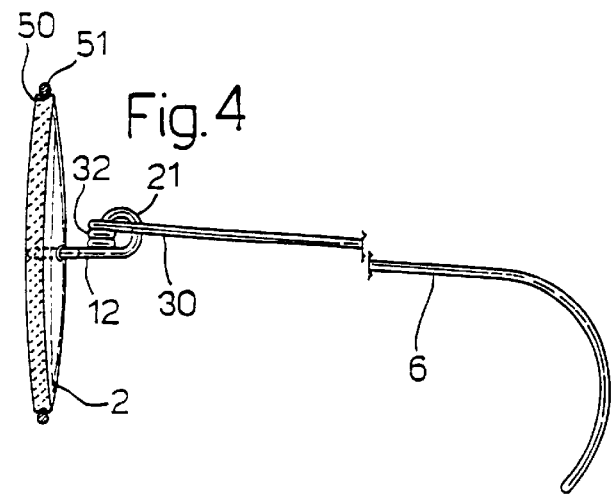
FIG. 4 shows a section along line IV—IV in FIG. 2.

The spectacles according to the present invention and as shown in FIGS. 1 and 2 are of the type featuring a discontinuous, so-called "GLASANT" mount, i.e. with no connections between the hinges and the intermediate bridge, in that the lenses themselves act as a supporting and connecting element. This type of mount substantially comprises a structure in two specular parts fitted to the outer edges of the lenses and presenting hinges about which the lateral arms rotate. What is said in the following description relative to the hinges, however, also applies to mounts of other types (other than GLASANT) and to nonsymmetrical mounts.

Spectacles 1 comprise two lenses 2 connected by a bridge 3, a mount 4 including hinges 5, and two lateral arms 6 rotatable on hinges 5 between a closed position 7 shown by the dot-and-dash line in FIG. 2, and an open or work position 8. A preferred embodiment of the mount according to the invention is shown in detail in FIGS. 5 to 7. Mount 4 is made entirely of wire material, preferably metal wire of superior mechanical characteristics, such as a high degree of resilience, but of sufficient elasticity to permit a small amount of elastic deformation necessary for fitment of the lenses to the mount, and capable of permanent deformation to adapt to particular anatomical features. The metal wire must also present superior aesthetic characteristics, must be resistant to oxidation by air and humidity, and must be resistant to staining in contact with exudation substances, such as perspiration when handled.

The most advantageous wire for such applications preferably comprises titanium or an alloy thereof, but, for aesthetic purposes, the titanium wire may be plated with noble metal, such as gold, silver or platinum and/or alloys thereof, or the wire may be made entirely of gold, silver, platinum, or even stainless steel, composite materials, carbon fiber, etc.

Mount 4 comprises for each lateral arm 6 a fastening element 10 (FIG. 5) comprising a portion of wire bent into a U-shaped bend comprising an inner arm 11 and an outer arm 12 parallel to each other and joined by a curved portion of wire 26; arms 11, 12 and curved portion 26 lie in the same plane; inner arm 11 presents a free end 13 insertable inside a hole or recess 14 formed through lens 2 (FIG. 8) close to the outer edge 16 (FIG. 1), and, in the example shown, is longer (but may even be shorter) than the thickness of lens 2; outer arm 12 is fitted inside a groove 18 formed on the outer edge of lens 2 and substantially parallel to hole 14; outer arm 12 flexes against lens 2 to safely support it and prevent it from rotating about inner arm 11; outer arm 12 continues with a curved portion of wire 20 substantially in the form of an arc, to define an eyelet 21 of about 270° and lying in a plane other than (e.g. perpendicular to) that of arms 11 and 12; and eyelet 21 terminates with a straight end portion 22 (FIG. 6) resting laterally on the outside of outer arm 12. More specifically, eyelet 21 is so deformed that the free end 24 of end portion 22 is forced elastically into tangential contact with outer arm 12, which, in this case, acts as a lateral stop on the outer side, but which may also act as a lateral stop on the inner side; and straight end portion 22 forms the fixed part of hinge 5, and is used as the pin 23 of hinge 5 about which lateral arm 6 rotates.

Eyelet 21 is thus defined by a first end 17 connected to fastening element 10, and by an opposite end 19 in the transition region between curved portion 20 and straight end portion 22.

Each lens 2 is fitted to mount 4 by inserting inner arm 11 into hole 14 from the front of lens 2, so that curved portion 26 joining arms 11 and 12 acts as an effective locating element for maintaining lenses 2 correctly positioned and equally adjusted on both the left and right side of the mount. Moreover, the lenses are prevented from being withdrawn accidentally from the mount by the thrust to which the lenses are predominantly subjected in use tending to push the lenses towards the front of the mount while at the same time maintaining the correct position of the lenses.

The above solution affords numerous advantages as compared with known mounts currently available. Forming only one relatively small-diameter hole results in practically no weakening of the lens, unlike the formation of an opening for the passage of two spaced wires compressed inside the opening; in view of the very low tensile strength of the materials from which the lenses are made, gripping the lens by compression between arms 11 and 12 is decidedly safer than subjecting it to tensile stress; assembling arms 11 and 12 horizontally as opposed to vertically provides for reducing visual interference, in that the human eye is less sensitive to horizontal than vertical lateral images; and, finally, the vertical arrangement of eyelet 21 provides for reducing the lateral outer size of the mounting.

The straight portion of pin 23 is fitted with the movable part of hinge 5 connected to lateral arm 6, and which comprises a coiled portion of wire 32 with a predetermined number of turns and connected to end 31 (FIG. 2) of lateral arm 6 by a straight initial portion 30 of metal wire aligned with lateral arm 6. Coiled portion 32 presents an inner hole of such a diameter as to permit insertion of the straight portion of pin 23. In fact, the two parts 22, 32 of each hinge 5 are physically separate and free to move in relation to each other both axially for assembly or making replacements, and rotationally to permit lateral arm 6 to rotate in use. To assemble or remove coiled portion 32 on to/off pin 23, coiled portion 32 must be slipped over arm 12, from the outside to the inside of arm 12 in opposition to the elastic resistance of eyelet 21. Moreover, by appropriately sizing the length of coiled portion 32, this may be preloaded at assembly and so act as a friction element in use.

The winding direction of coiled portion 32 is such that the straight end portion 30 of lateral arm 6 joined to coiled portion 32 is located adjacent to eyelet 21, which is thus so located as to intercept lateral arm 6 and so prevent it from rotating beyond the open or work position 8 (FIG. 2); and by slightly deforming eyelet 21 or parts 21, 30, 17, 12, the opening of lateral arm 6 may be adjusted easily to the anatomy of the user. The free end 33 of coiled portion 32 opposite straight end portion 30 is cut off and presents a surface 34 (FIG. 6) tangent to straight portion 22 and at the same time perpendicular to the direction of straight end portion 30 of lateral arm 6, which surface 34 elastically contacts the outer side of outer arm 12 to prevent lateral arm 6 from contacting the lens when rotated into closed position 7. To achieve this, the correct number of turns of coiled portion 32 may, for example, be a whole number of turns, e.g. 3, plus a half turn; and the same result is also achieved without bending or cutting free end 33.

Despite lateral arms 6 being free to rotate on hinges 5, coiled portion 32 fitted to straight portion 22 is gripped elastically against outer arm 12 by curved portion 20 of eyelet 21 to brake the movement of lateral arm 6; and, since the free end 24 of straight portion 22 is maintained elastically contacting the outer side of outer arm 12, the cylindrical envelope of coiled portion 32 is tangent to the inner or outer stop edge of outer arm 12, thus reducing the size of coiled portion 32.

Figure 3:
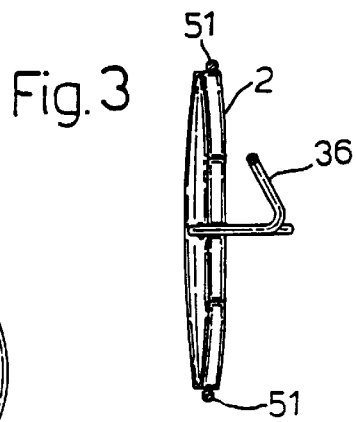
FIG. 3 shows a section along line III—III in FIG. 1.

The perfected mount according to the present invention comprises an intermediate bridge 3 (FIGS. 2, 8) for connecting the lenses, and which is made of the same or a different type of wire as for the rest of the mount, depending on requirements. Since bridge 3 is symmetrical in relation to the center line M of the spectacles (FIGS. 2, 8), only the left-hand part of the bridge shown in FIGS. 2 and 8 will be described for the sake of simplicity. Bridge 3 comprises an upwardly-convex, forward-inclined central connecting portion 36 (FIGS. 2, 3) connected at each end to respective lenses 2 by respective anchoring elements 38 identical and symmetrical with each other. Each element 38 comprises a portion of wire bent into a U and presenting two straight arms 40, 41 connected to each other by a portion of wire 39 which, in the non-limiting example shown, is curved; and arm 41, at the opposite end to curve 39, is connected to bridge 3.

Arm 40 is inserted inside a respective hole 43 formed through the thickness of lens 2 close to edge 44 of the lens, and, when assembled, presents a free end 45 projecting sufficiently from the rear of the lens to support an element whereby to rest the mount on the nose of the user; which so-called "nose rest" element is described in detail in Italian Patent Application entitled "Spectacle mount with a perfected intermediate bridge between the lenses" filed concurrently by the present Applicant and to which reference is made herein as required.

The other arm 41 of anchoring element 38 is flexed slightly into a groove 47 formed, parallel to the axis of hole 43, on edge 44 of the lens. When so assembled, the lenses are firmly anchored to bridge 3, any relative rotation of the lenses is prevented by the elastic compression exerted by arms 40, 41 between hole 43 and groove 47, and, unlike many known spectacle designs, no dangerous tensile stress is applied to the lenses.

In certain embodiments of the mount according to the invention, portion 45 of arm 40 projecting from the rear of the lens may be threaded to receive a nut for gripping the lens, and which, for aesthetic reasons, may be made of noble metal and/or conveniently embellished.

To prevent chipping along the edge of the lenses, a peripheral groove or chamfer 50 is formed along the whole or part of the edge of the lens, for housing a rubber ring 51 of appropriate section (not necessarily toroidal, as shown) and similar to an O-ring. In addition to protection, ring 51 may also be ornamental, in which case, it may be made of coloured, e.g. brightly coloured, material.

Clearly, changes may be made to the perfected spectacle mount as described and illustrated herein without, however, departing from the scope of the present invention.

For example, the bridge may be fitted with one or more hinges of the type shown in FIGS. 5, 6 and 7, so that the mount presents two halves rotatable about the hinge.

Also, the lateral arms of the mount may be telescopic and comprise a first portion presenting a substantially straight first end portion connected to the hinge of the lateral arm, and a substantially coiled second end portion; and a second portion defining, at the end, a pin housed in sliding manner in said coiled portion.

I claim:

1. A perfected mount for spectacles with at least two lenses, the mount comprising two lateral arms (6) pivoting on respective hinges (5) connected to said lenses; an intermediate connecting bridge (3) between said lenses; and stop means for arresting said lateral arms; said hinges being made of wire material, and each comprising a portion connected to a respective said lens, and a portion connected to a respective said lateral arm; a first of said portions terminating with a straight portion (22) of wire acting as a pin (23); and a second of said portions comprising a coiled portion (32) of wire coiled about said straight portion (22);

said stop means comprise an eyelet (21) of wire formed in one piece with said first portion and presenting an end (19) terminating with said straight portion (22), which is forced elastically by the eyelet against a lateral stop (10) of the first portion acting as an axial stop for said coiled portion (32) on the opposite side of said eyelet; said eyelet cooperating with the respective said lateral arm to prevent rotation of said lateral arm beyond a normal work position.

2. A perfected mount as claimed in claim 1, characterized by comprising an elastic fastening element (10) of wire, for fastening each said hinge on one side to said respective said lens; said stop means being located between said fastening element (10) and said straight portion (22); and said eyelet comprising a first end (17) opposite the aforementioned end (19) and connected to said fastening element (10).

3. A perfected mount as claimed in claim 2, characterized in that said stop means also comprise a free end (33) of said coiled portion (32), said free end (33) possibly presenting a cut-off surface (34), and said free end (33) contacting said fastening element (10) to arrest rotation of said lateral arm in the direction of said lens.

4. A perfected mount as claimed in claim 2, characterized in that said coiled portion (32) is permitted to rotate about an intermediate portion (23) of said straight portion (22), extending between said fastening element (10) and one end (19) of said eyelet (21), and is retained on said intermediate portion (23) by said fastening element (10) and said eyelet.

5. A perfected mount as claimed in claim 2, characterized in that said eyelet (21) is deformed elastically to exert a braking action on said coiled portion (32) and reduce uncontrolled movement of said lateral arm.

6. A perfected mount as claimed in claim 2, characterized in that the cylindrical envelope of said coiled portion (32) is tangent to one side of an arm (12) of said fastening element (10).

7. A perfected mount as claimed in one of the foregoing claims from 2 to 6, characterized in that each said lens presents a first through hole (14) and a second through hole (43) adjacent, on opposite sides, to the edge of said lens; said fastening element (10) being inserted inside said first hole to support said lens on said mount.

8. A perfected mount as claimed in claim 7, characterized in that said fastening element (10) comprises a first arm (11) insertable inside said first hole (14); and a second arm (12) connected to said first arm and which is forced elastically against the outer edge of said lens to grip said lens elastically by compression.

9. A perfected mount as claimed in claim 8, characterized in that an outer groove (18) is formed, parallel to said first hole (14), on said outer edge, to house said second arm (12).

10. A perfected mount as claimed in claim 8, characterized in that said first and second arms (11, 12) are joined continuously to each other by a curved portion of wire (26); and said first arm (11) is inserted inside said first hole (14) in said lens from the front of the lens; said curved portion (26) constituting a locating element for maintaining said lens in the work position on said mount.

11. A perfected mount as claimed in claim 10, characterized in that said first and second arms (11, 12) and said curved portion (26) all lie in the same plane.

12. A perfected mount as claimed in claim 2, characterized in that said intermediate bridge (3) comprises a central portion of wire continuing at each end with a pair of anchoring elements (38) connectable to respective said lenses; each anchoring element (38) comprising a first portion of wire (40) insertable inside a second hole (43) in said lens, and a second portion of wire (41) which is forced against the outer edge of said lens to elastically grip said lens by compression; said anchoring elements (38) being precedable by connections for respective nose rests.

13. A perfected mount as claimed in claim 12, characterized in that a groove (47) is formed on the edge of each said lens and adjacent and parallel to said second hole (43), for housing said second portion of wire (41).

14. A perfected mount as claimed in claim 2, characterized in that said intermediate bridge (3) comprises a first portion and a second portion connected to each other by a hinge.

15. A perfected mount as claimed in claim 14, characterized in that said hinge comprises a first straight portion of wire connected to one of said first and second portions of said intermediate bridge and defining a pin; and a second portion of wire connected to another of said first and second portions and coiled about said pin.

16. A perfected mount as claimed in claim 14, characterized in that said lateral arms are telescopic.

17. A perfected mount as claimed in claim 16, characterized in that said lateral arms (6) each comprise a first portion presenting a first substantially straight end portion connected to said hinge (5), and a second substantially coiled end portion; and a second portion defining, at one end, a pin housed in sliding manner in said coiled portion.

18. A perfected mount as claimed in claim 17, characterized in that said pin presents circumferential grooves defining fixed axial positions of said pin inside said coiled portion.

19. A perfected mount as claimed in claims 17, characterized in that said wire is made of a material selected from a group comprising:

stainless steel, titanium or alloys thereof, composite materials, carbon fibers, noble metals such as gold, silver, platinum, or alloys thereof.

20. A perfected mount as claimed in claim 17, characterized in that said wire is plated with noble metals comprising gold, silver, platinum and/or alloys thereof, or is colour teflon coated.

21. A perfected mount as claimed in claims 16, characterized in that a chamfer (50) is formed in the edge about each said lens to house a ring (51) for protecting said edge.

* * * * *